(12) United States Patent
Ohsawa

(10) Patent No.: US 6,538,742 B1
(45) Date of Patent: Mar. 25, 2003

(54) COLOR REPRODUCING SYSTEM

(75) Inventor: Kenro Ohsawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/510,787

(22) Filed: Feb. 23, 2000

(30) Foreign Application Priority Data

Feb. 25, 1999 (JP) .......................................... 11-048042

(51) Int. Cl.⁷ .............................................. G01N 21/25
(52) U.S. Cl. ........................ 356/405; 356/406; 345/604
(58) Field of Search ................................ 356/405, 406; 348/187–191; 358/518; 345/604, 639

(56) References Cited

U.S. PATENT DOCUMENTS

| | | | | |
|---|---|---|---|---|
| 4,500,919 A | * | 2/1985 | Schreiberg | |
| 5,579,031 A | * | 11/1996 | Liang | |
| 5,583,666 A | * | 12/1996 | Ellson et al. | 358/518 |
| 6,101,272 A | * | 8/2000 | Noguchi | 382/167 |
| 6,225,974 B1 | | 5/2001 | Marsden et al. | |
| 6,262,744 B1 | | 7/2001 | Carrein | |

FOREIGN PATENT DOCUMENTS

| | | |
|---|---|---|
| JP | 06-261332 A | 9/1994 |
| JP | 09-326981 A | 12/1997 |

OTHER PUBLICATIONS

"Color Image Duplication", pp. 136–137, Johji Tajima, Maruzen Co., Ltd., Tokyo, Japan, Sep. 30, 1996.

"Introduction to Color Reproduction Technology", pp. 37–39, Noburo Ohta, Corona Publishing Co., Ltd., Tokyo, Japan, Sep. 10, 1997.

* cited by examiner

*Primary Examiner*—Frank G. Font
*Assistant Examiner*—Layla Lauchman
(74) *Attorney, Agent, or Firm*—Frishauf, Holtz, Goodman & Chick, P.C.

(57) ABSTRACT

A color reproduction system includes a color conversion unit for displaying a color image on a multi-primary-color display. The color conversion unit includes a maximum brightness signal calculating unit for calculating signals corresponding to three color reproduction area corners as the corners of a plane that constitute a color reproduction area surface of the display. The three color reproduction area corners surround the vectors of input tristimulus values. The maximum brightness signal calculating unit also calculates a weighting factor obtained when the input tristimulus values are expressed as a linear sum of the tristimulus values of the color reproduction area corner vectors. The color conversion unit further includes a color image signal calculating unit for calculating a color image signal used to display the input tristimulus values, on the basis of the signals corresponding to the color reproduction area corners and the weighting factor. The color reproduction system can realize colorimetrically accurate reproduction, provide continuity between XYZ data and signal values, and use the color reproduction area to the maximum extent.

22 Claims, 7 Drawing Sheets

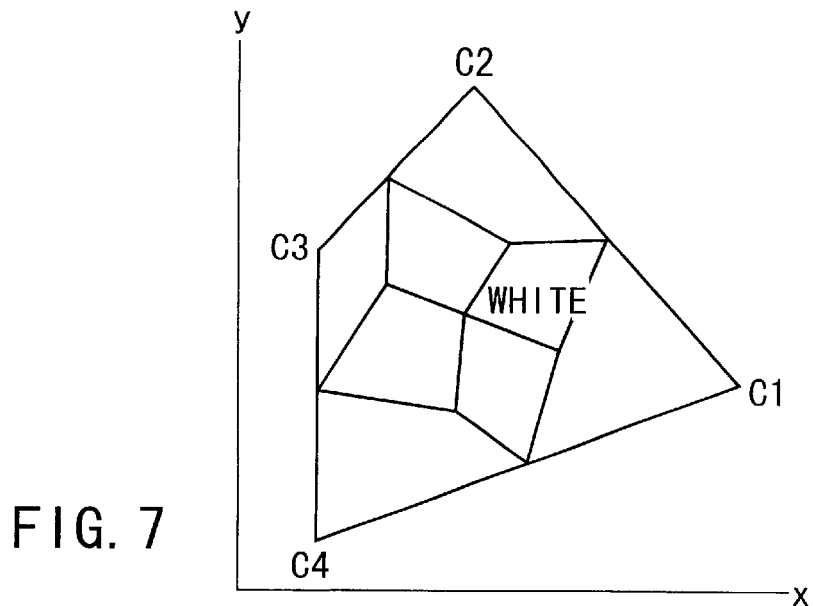
FIG. 7
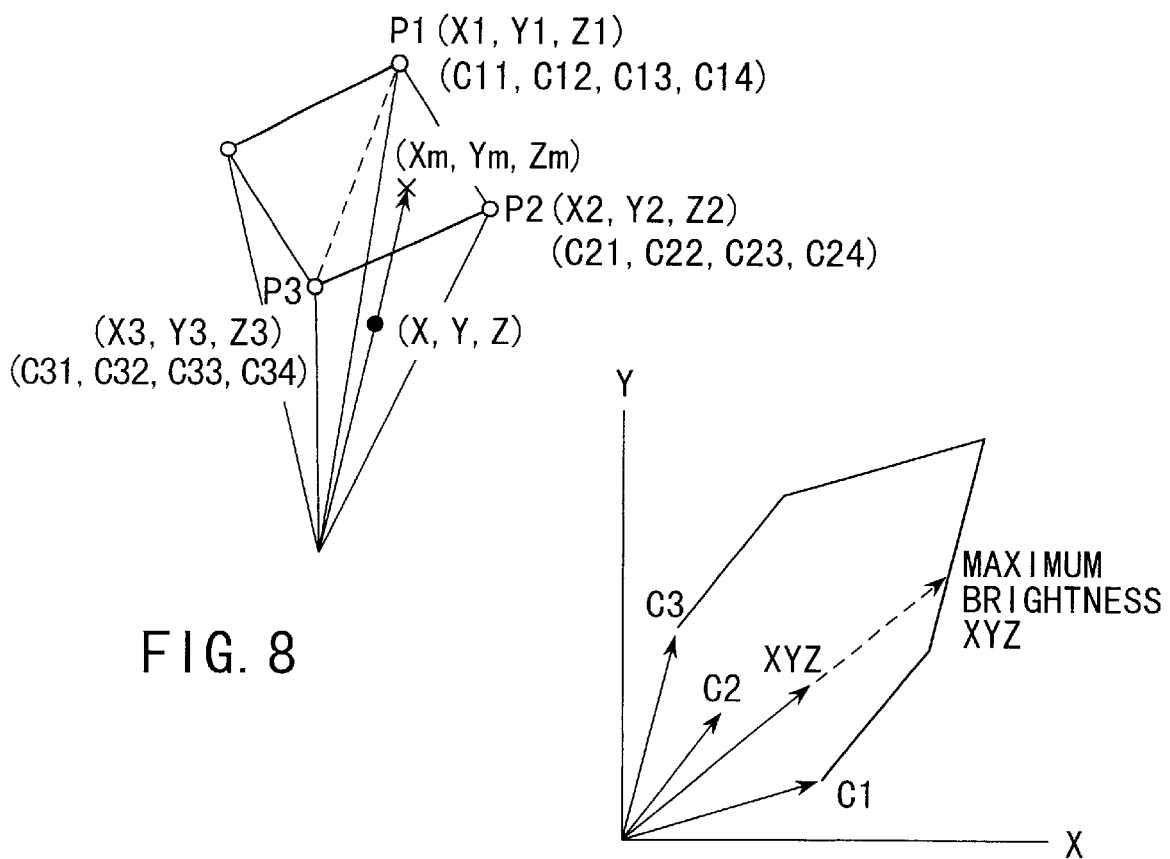
FIG. 8
FIG. 9

COLOR REPRODUCING SYSTEM

CROSS-REFERENCE TO RELATED APPLICATION

This application is based upon and claims the benefit of priority from the prior Japanese Patent Application No. 11-048042, filed Feb. 25, 1999, the entire contents of which are incorporated herein by reference.

BACKGROUND OF THE INVENTION

This invention relates to a color reproduction system including a color image processing apparatus for obtaining an input color image signal used to display any desired color on a color image display.

In general, display apparatuses such as CRT displays, liquid crystal displays, liquid crystal projectors, etc. are widely used as means for reproducing a digital color image input by an image input device such as a color scanner, a digital camera, etc.

In these display apparatuses, various colors are usually reproduced by additive color mixture of three primary colors RGB (red, green and blue).

The color gamut (color reproduction area) that can be reproduced on a display is limited to a region in which each color is expressed as the sum of color vectors of the three primary colors in the three dimensional color space. For example, in a CRT display for reproducing colors using three kinds of fluorescent substances, i.e. Red, Green and Blue, the color reproduction area corresponds to a hexahedron having corners (0, 0, 0), (Xr, Yr, Zr), (Xg, Yg, Zg), (Xb, Yb, Zb), (Xr+Xg, Yr+Yg, Zr+Zg), (Xg+Xb, Yg+Yb, Zg+Zb), (Xb+Xr, Yb+Yr, Zb+Zr), (Xr+Xg+Xb, Yr+Yg+Yb, Zr+Zg+Zb), assuming that (Xr, Yr, Zr), (Xg, Yg, Zg) and (Xb, Yb, Zb) represent X, Y and Z data which belongs to the CIE1931 color system (XYZ color system) which are obtained when RGB fluorescent substances emit maximum light respectively.

FIG. 16 schematically shows a color reproduction area in the XYZ space of such a three-primary-color display. If this area is expressed using an xy chromaticity diagram, it corresponds to the interior of a triangle formed by the chromaticity of each primary color, as is shown in FIG. 17.

In the display using the additive color mixture of three primary colors RGB as the color reproduction principle, the relationship between RGB signal values input to the display and XYZ values of each color displayed thereon is uniquely determined in the color reproduction area of the display.

If it is assumed that the emission spectrum of each primary color is independent of the intensity of any other primary color, and the relative spectral distribution does not depend upon the intensity of emission (i.e., the chromaticity does not vary even if the emission intensity varies), the X, Y and Z data of a to-be-displayed color corresponding to input RGB values are given by the following formula:

$$\begin{pmatrix} X \\ Y \\ Z \end{pmatrix} = \begin{pmatrix} Xr & Xg & Xb \\ Yr & Yg & Yb \\ Zr & Zg & Zb \end{pmatrix} \begin{pmatrix} R' \\ G' \\ B' \end{pmatrix} \quad (1)$$

$$R' = \gamma_r(R)$$
$$G' = \gamma_g(G)$$
$$B' = \gamma_b(B)$$

where Xr, Xg and Xb represent the respective X data items obtained when the RGB fluorescent substances emit maximum light, similarly, Yr, Yg and Yb represent the respective Y data items obtained when the RGB fluorescent substances emit maximum light, and Zr, Zg and Zb represent the respective Z data items obtained when the RGB fluorescent substances emit maximum light. Further, $\gamma r$, $\gamma g$ and $\gamma b$ represent functions indicating the relationship between the input signal value and the output luminescence, and R', G' and B' represent signal values normalized so that they will be "1" when the RGB fluorescent substances emit maximum light.

From the reverse relationship of the above, input RGB values for displaying desired X, Y and Z data are given by the following formula:

$$R = \gamma_r^{-1}(R') \quad (2)$$
$$G = \gamma_g^{-1}(G')$$
$$B = \gamma_b^{-1}(B')$$

$$\begin{pmatrix} R' \\ G' \\ B' \end{pmatrix} = \begin{pmatrix} Xr & Xg & Xb \\ Yr & Yg & Yb \\ Zr & Zg & Zb \end{pmatrix}^{-1} \begin{pmatrix} X \\ Y \\ Z \end{pmatrix}$$

where "−1" indicates inverse function and inverse matrix. Thus, in the three primary color display, it is easy to model the relationship between XYZ data and RGB values, and a conversion method using matrix conversion and gradation correction is generally used as described in "COLOR IMAGE DUPLICATION" (written by Johji Tajima and published by Maruzen Co., Ltd.).

If in the three primary color display, a point (X, Y, Z) falls out of the color reproduction area of the display, one of R', G' and B' obtained from the formula (2) is "negative" or "higher than 1".

As described above, in the display apparatus using, as the principle, the additive color mixture of three primary colors, the area determined by the chromaticity coordinates of each primary color is the color reproduction area. In order to enlarge the color reproduction area, it is considered to increase the chroma of each primary color or to increase the number of primary colors.

For example, as is disclosed in NHK Technology Research Published Documents (published by NHK Broadcasting Technology Research, Tokyo 1995), an attempt has been made to realize a wider color reproduction area than the conventional three-primary-color display by using four primary colors instead of three primary colors.

FIGS. 18 and 19 show a color reproduction area in the XYZ space of the four primary color display, and a color reproduction area in the xy chromaticity diagram, respectively.

Also in the case of a multi-primary-color display using a number N of primary colors not less than four primary colors, the XYZ data of each to-be-displayed color corresponding to signal values can be given by the following formula that is obtained by generalizing the formula (1):

$$\begin{pmatrix} X \\ Y \\ Z \end{pmatrix} = \begin{pmatrix} Xc1 & Xc2 & Xc3 & \cdots & XcN \\ Yc1 & Yc2 & Yc3 & \cdots & YcN \\ Zc1 & Zc2 & Zc3 & \cdots & ZcN \end{pmatrix} \begin{pmatrix} C1' \\ C2' \\ C3' \\ \vdots \\ CN' \end{pmatrix} \quad (3)$$

$$C1' = \gamma1(C1)$$

-continued $$C2' = \gamma 2(C2)$$

$$C3' = \gamma 3(C3)$$

$$CN' = \gamma N(CN)$$

The conversion from XYZ data into signal values, which is considered a reverse relationship with respect to the formula (3), is not directly executed except for the surface of the color reproduction area of the multi-primary-color display.

It is necessary to execute conversion with signal values corresponding to X, Y and Z determined on the basis of certain conditions. For example, Japanese Patent Application KOKAI Publication No. 6-261332 discloses a color conversion method employed in a multi-primary-color display.

In a conversion method as a first invention of the application, color reproduction is executed using the linear sum of three primary colors selected on the basis of the chroma values of input colors. In this method, accurate color reproduction can be executed within a range in which reproduction can be realized on the basis of the selected three primary colors. However, since the method does not consider a color reproduction area in the direction of brightness in the multi-color display, it cannot deal with all reproducible input colors.

Moreover, in a second invention disclosed in the above publication, linear conversion is executed using multiple primary colors. In this case, however, it is not guaranteed whether a solution that imparts a positive value to any primary color signal can be obtained. Accordingly, there is a case where even a reproducible input color cannot accurately be reproduced.

To execute accurate color reproduction, the color conversion method for display apparatuses including a multi-primary-color display that uses four or more primary colors needs to satisfy the following conditions:

First, colorimetrically accurate color reproduction can be executed.

Second, there is continuity between XYZ data and signal values.

Third, conversion that satisfies the above conditions is executed within all the color reproduction area.

In addition to the above conditions, high-speed conversion is demanded. Moreover, it is desirable that colorimetrically accurate conversion can be executed even where additive color mixture cannot strictly be executed (i.e. even where the emission spectra of primary colors are not independent of each other).

BRIEF SUMMARY OF THE INVENTION

It is the object of the invention to provide a color reproduction system including a multi-primary-color display which can realize colorimetrically accurate color reproduction, can impart continuity between XYZ data and signal values, and can use its color reproduction area to the maximum extent.

According to an aspect of the invention, there is provide a color reproduction system having color image display means, and color conversion means for converting input tristimulus values into a color image signal to be input to the color image display means, wherein the color conversion means comprising: maximum brightness signal calculating means for calculating three color reproduction area corner vectors that indicate three corners of a plane constituting a color reproduction area surface of the color image display means, the three color reproduction area corner vectors surrounding vectors of the input tristimulus values, the maximum brightness signal calculating means also calculating a weighting factor obtained when the input tristimulus values are expressed as a linear sum of tristimulus values of the color reproduction area corner vectors; and color image signal calculating means for calculating a color image signal used to display the input tristimulus values, on the basis of signal values corresponding to the color reproduction area corner vectors and the weighting factor.

According to another aspect of the invention, there is provided a color reproduction system having color image display means, and color conversion means for converting input tristimulus values into a color image signal to be input to the color image display means, wherein the color conversion means comprising: chromaticity area calculating means for calculating a chromaticity area surrounded by corners of planes constituting a color reproduction area surface of the color image display means; matrix calculating means for calculating matrix data that provides a relationship between tristimulus values of the corners and the color image signal; matrix data storage means for storing the matrix data in relation to the chromaticity area; and color image signal calculating means for converting the input tristimulus values into the color image signal, using part of the matrix data selected on the basis of chromaticity values of the input tristimulus values.

The color reproduction system constructed as above can convert image data XYZ into signals to be input to a display that realizes colorimetrically accurate reproduction, and can satisfy the conditions that there must be continuity between XYZ data and signal values, and that the color reproduction area must be used to the maximum extent. As a result, the system can realize accurate correspondence between the XYZ data and the signal values even in the case of a display in which additive color mixture cannot strictly be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a graph useful in explaining planes that constitute the color reproduction area of a four-primary-color display;

FIG. 8 is a view useful in explaining the relationship between XYZ data and a maximum brightness signal;

FIG. 9 is a view useful in explaining the concept of a maximum brightness vector;

DETAILED DESCRIPTION OF THE INVENTION

The embodiments of the invention will be described in detail with reference to the accompanying drawings.

Figure 1:
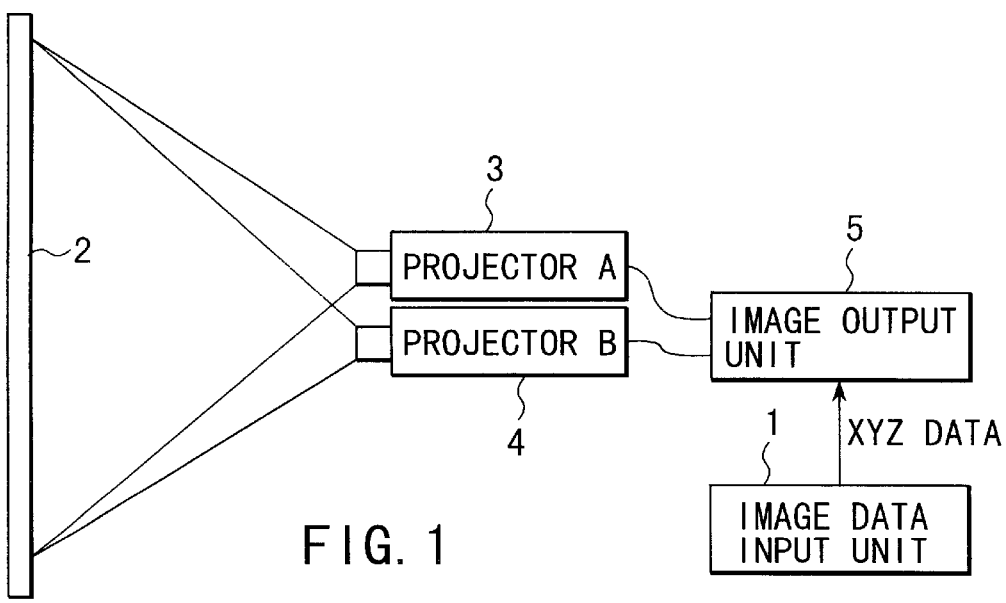
FIG. 1 is a schematic view illustrating a multi-primary-color projector system as a color reproduction system according to a first embodiment of the invention.

FIG. 1 is a schematic view illustrating a color reproduction system according to a first embodiment of the invention.

This color reproduction system comprises an image data input unit 1 for creating image data by executing predetermined processing on an input image, projectors 3 and 4 for projecting an image onto a screen 2, and an image output unit 5 for converting image data from the image input unit 1 and outputting the converted data to the projectors 3 and 4.

Using, at the time of image input, data on the spectral response characteristic of the image input unit and on illumination light used at the time of the image input, the image data input unit 1 converts color image data input by an image input unit such as a digital camera, a color scanner, etc. (not shown), into image data that consists of XYZ data belonging to the CIE1931 color system and imparted to each pixel. The converted data is output to the image output unit 5.

The image output unit 5 converts the XYZ data into (primary color) signals C1 and C2 to be input to the projector 3, and also into (primary color) signals C3 and C4 to be input to the projector 4, thereby outputting them. The projectors 3 and 4 having received the signals project, onto the screen 2, a four-primary-color image reproduced on the basis of the input signals C1, C2, C3 and C4.

Suppose that the projectors 3 and 4 have the same structure except for their respective primary color spectra to be projected onto the screen 2, and that the positions of images to be projected onto the screen 2 are adjusted in advance so that they will accurately coincide with each other as shown in FIG. 1.

Figure 2:
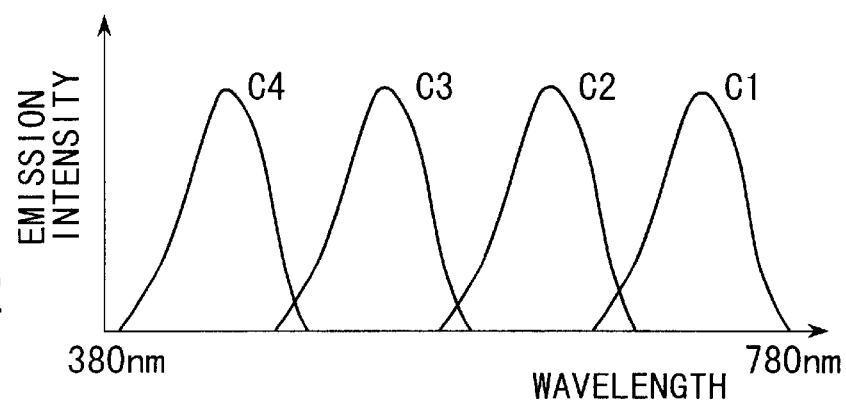
FIG. 2 is a graph useful in explaining the spectra of four primary colors employed in the first embodiment.

FIG. 2 shows emission spectra of primary colors C1, C2, C3 and C4 of the projectors 3 and 4. As shown, the emission spectra of the four primary colors distribute within a visible wavelength range of 380–780 nm.

Figure 3:
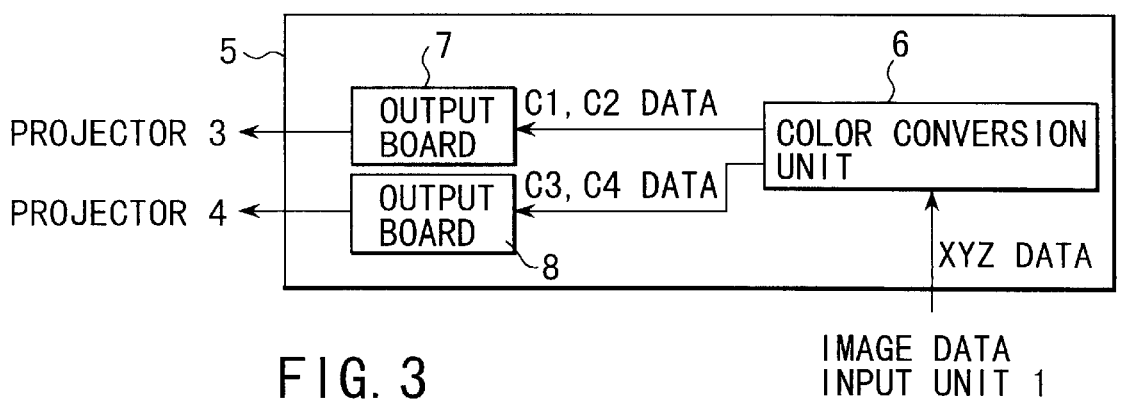
FIG. 3 is a block diagram illustrating an example of a detailed structure of an image output unit appearing in FIG. 1.

Referring then to FIG. 3, the image output unit 5 appearing in FIG. 1 will be described. The image output unit 5 comprises a color conversion unit 6 and output boards 7 and 8.

The color conversion unit 6 converts XYZ data input by the image data input unit 1 into input signals C1, C2, C3 and C4 to the projectors 3 and 4 for reproducing an image on the screen 2. The input signals C1, C2, C3 and C4 are input to the projectors 3 and 4 via the output boards 7 and 8, respectively.

Figure 4:
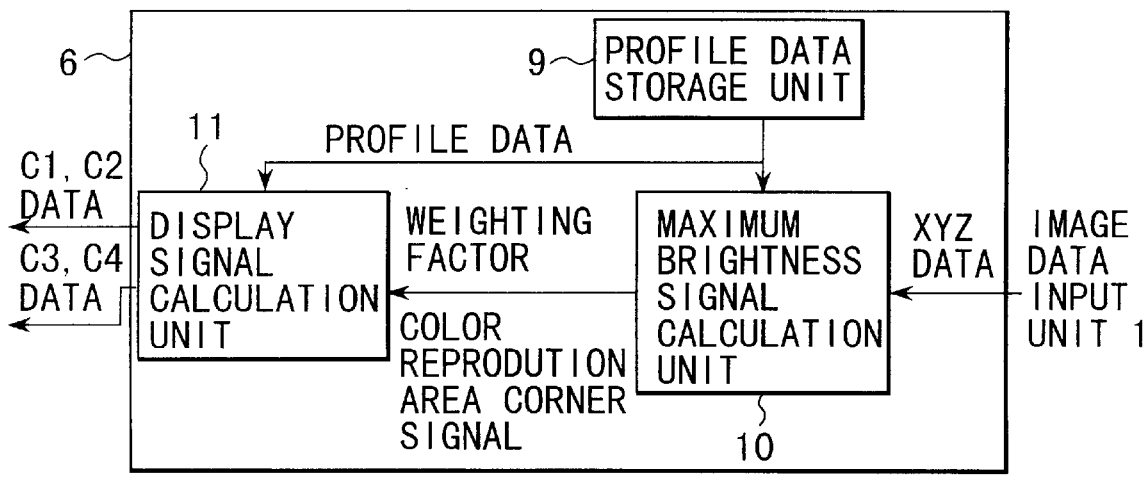
FIG. 4 is a block diagram illustrating an example of a detailed structure of a color conversion unit appearing in FIG. 3.

Referring to FIG. 4, a specific structure of the color conversion unit 6 will be described.

The color conversion unit 6 includes a profile data storage unit 9 that stores pre-measured profile data of the projectors 3 and 4; a maximum-brightness-signal calculation unit 10 for calculating the signal values (color reproduction area corner signals) of the corner vectors of the color reproduction area surfaces of a display, which enclose the XYZ data, and also calculating their weighting factors, using the profile data; and a display signal calculation unit 11 for converting the XYZ data into the input signals C1, C2, C3 and C4 on the basis of the color reproduction area corner signals, their weighting factors and gradation characteristic data included in the profile data. The profile data storage unit 9 stores XYZ data obtained when each primary color fluorescent substance emits maximum light, and gradation characteristic data which imparts the relationship between input signal values and emission brightness.

Figure 5:
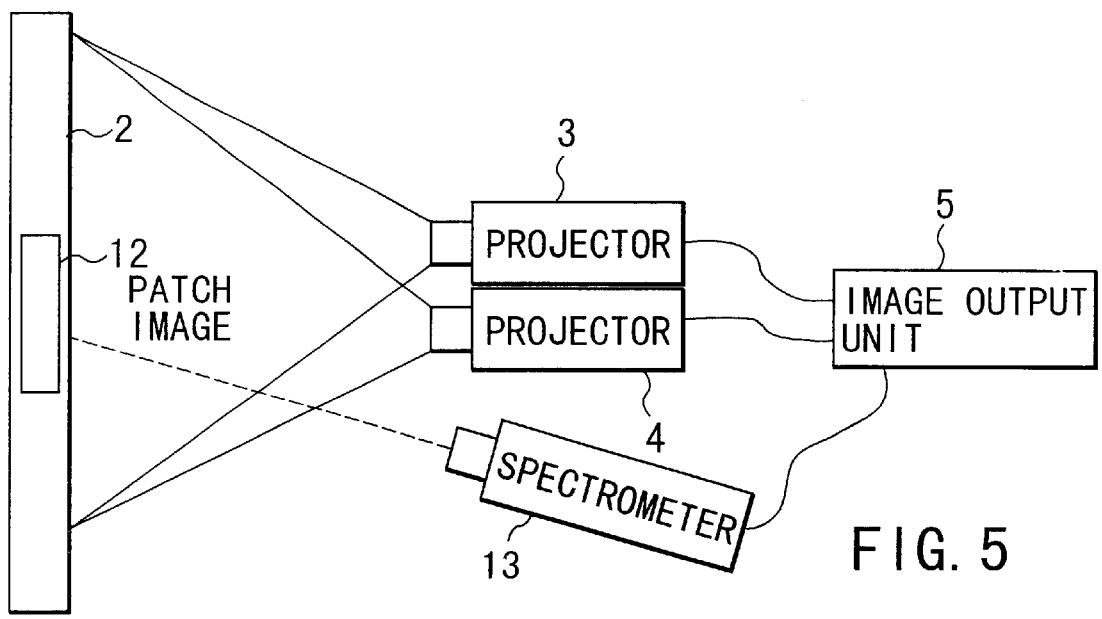
FIG. 5 is a view showing an example of a structure for measuring a display profile.

These data items are obtained by displaying on the screen 2 a patch image 12 of a sample signal value for each primary color, and measuring its XYZ data in synchronism with the display of the image by means of a spectrophotometer (or colorimeter) 13, as shown in FIG. 5.

The obtained measurement data is input to the image output unit 5, where it is converted into data of a predetermined format. This data is then stored as profile data in the profile data storage unit 9. The maximum-brightness-signal calculation unit 10 supplies the display signal calculation unit 11 with color reproduction area corner signals corresponding to the XYZ data of the corners of color reproduction area surfaces that enclose input XYZ data (i.e. XYZ data of color reproduction area corners), and also with a weighting factor obtained when the XYZ data is expressed as the linear sum of the XYZ data of color reproduction area corners.

Since each primary color signal of the color reproduction area corners indicates "0" or "maximum emission", XYZ data can be calculated by adding, to a corresponding weighting factor, XYZ data obtained when a primary color corresponding to a primary color signal is at its maximum emission.

The method for calculating the color reproduction area corner signal will now be described in detail.

The surfaces of the color reproduction area of the four-primary-color display consist of twelve quadrilateral planes, and the plane which the XYZ vector intersects is one of eight planes except for the four planes that pass the origin.

The quadrilaterals on the chromaticity diagram shown in FIG. 7 indicate the planes, each corner of which consists of a combination of signal values that make each primary color have "maximum value" or "0". These quadrilaterals are each divided into two triangles, whereby the number of surfaces is 16. Then, which triangle contains the XYZ data is determined by examining the triangles one by one.

More specifically, the determination which triangle contains the XYZ data is executed in the following manner. The XYZ data is expressed as the linear sum of the XYZ values (X1, Y1, Z1), (X2, Y2, Z2) and (X3, Y3, Z3) of the corners of a triangle, using formula (4). Further, weighting factors α, β and γ for the XYZ vectors of the corners are obtained using formula (5). The XYZ data of each corner is calculated on the basis of the XYZ data of each primary color at maximum emission.

If the weighting factors α, β and γ are all "positive", it is determined that the XYZ data is contained in the presently examined triangle. On the other hand, if at least one of the factors α, β and γ is "negative", it is determined that the XYZ data is not contained in the triangle. Further, if it is determined that all of the weighting factors α, β and γ have all positive values and at least one of them is higher than "1", or that the XYZ data is not contained in any triangle in all the color reproduction area surfaces, it is determined that the XYZ data does not fall within the color reproduction area of the display.

$$\begin{pmatrix} X \\ Y \\ Z \end{pmatrix} = \begin{pmatrix} X1 & X2 & X3 \\ Y1 & Y2 & Y3 \\ Z1 & Z2 & Z3 \end{pmatrix} \begin{pmatrix} \alpha \\ \beta \\ \gamma \end{pmatrix} \quad (4)$$

$$\begin{pmatrix} \alpha \\ \beta \\ \gamma \end{pmatrix} = \begin{pmatrix} X1 & X2 & X3 \\ Y1 & Y2 & Y3 \\ Z1 & Z2 & Z3 \end{pmatrix}^{-1} \begin{pmatrix} X \\ Y \\ Z \end{pmatrix} \quad (5)$$

Figure 6:
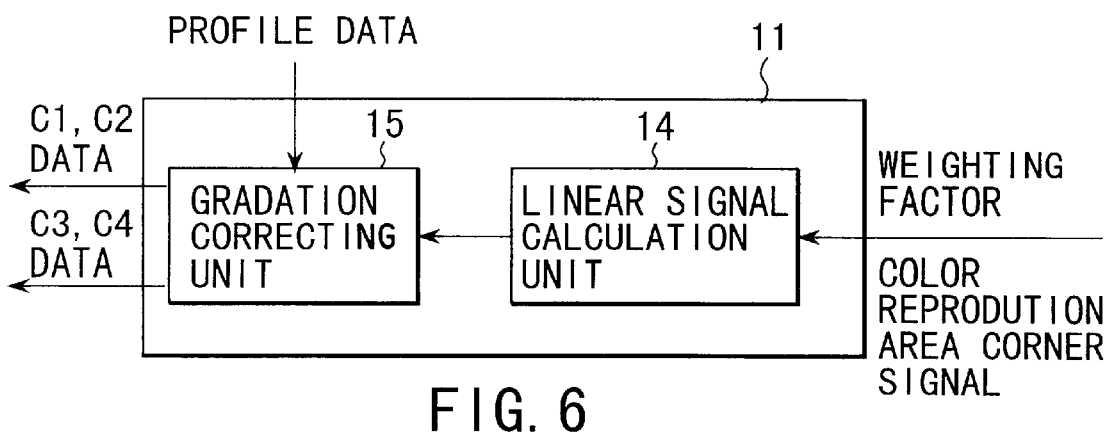
FIG. 6 is a block diagram showing an example of a structure of a display signal calculation unit appearing in FIG. 4.

The display signal calculation unit 11 includes a linear signal calculation unit 14 and a gradation correcting unit 15 as shown in FIG. 6.

The linear signal calculation unit 14 calculates display signals (Q1, Q2, Q3, Q4) having a linear relationship to XYZ data, on the basis of the weighting factors and color reproduction area corner signals (C11, C12, C13, C14), (C21, C22, C23, C24) and (C31, C32, C33, C34) corresponding to color reproduction area corners P1, P2 and P3, using the following formula:

$$\begin{pmatrix} Q1 \\ Q2 \\ Q3 \\ Q4 \end{pmatrix} = \begin{pmatrix} C11 & C21 & C31 \\ C12 & C22 & C32 \\ C13 & C23 & C33 \\ C14 & C24 & C34 \end{pmatrix} \begin{pmatrix} \alpha \\ \beta \\ \gamma \end{pmatrix} \quad (6)$$

$$= \begin{pmatrix} C11 & C21 & C31 \\ C12 & C22 & C32 \\ C13 & C23 & C33 \\ C14 & C24 & C34 \end{pmatrix} \begin{pmatrix} X1 & X2 & X3 \\ Y1 & Y2 & Y3 \\ Z1 & Z2 & Z3 \end{pmatrix}^{-1} \begin{pmatrix} X \\ Y \\ Z \end{pmatrix}$$

FIG. 8 shows the relationship between XYZ data and the color reproduction area corners P1, P2 and P3.

Display signals obtained using the formula (6) are identical to those obtained by multiplying, by a constant value $\underline{k}$, input XYZ data to calculate signal values Q1m, Q2m, Q3m and Q4m that impart maximum brightness XYZ (XmYmZm) data, and then multiplying them by 1/k.

Since a signal value corresponding to XYZ data can be determined as an output-allowable signal on the color reproduction area surfaces of the display, a colorimetrically accurate signal value corresponding to XYZ data that is obtained by multiplying the XmYmZm data by a predetermined constant value and has a lower brightness than the XmYmZm data can be calculated using a single conversion matrix.

FIG. 9 two-dimensionally shows the relationship between XYZ data, maximum brightness XYZ data and the color reproduction area of the display.

The gradation correcting unit 15 subjects each linear signal (Q1, Q2, Q3, Q4) input from the linear signal calculation unit 14 to gradation correction using gradation characteristic data contained in the profile data, and outputs the correction results as display signals (C1, C2, C3, C4) to the output boards 7 and 8. Gradation correction is executed using formula (7) that includes an inverse function $r^{-1}$ with respect to the gradation data which imparts output brightness values to input signals.

$$C1 = \gamma_1^{-1}(Q1)$$

$$C2 = \gamma_2^{-1}(Q2)$$

$$C3 = \gamma_3^{-1}(Q3)$$

$$C4 = \gamma_4^{-1}(Q4) \quad (7)$$

The above-described processing for obtaining a display signal from XYZ data is executed for each pixel, and the obtained display signal is input to the display unit. As a result, a colorimetrically accurate color image can be displayed.

Although in the embodiment, projectors are used as color image display units, the invention is not limited to this. The invention is also applicable to any optional display, such as a CRT display, a liquid crystal display, etc., which uses a mixture of primary color beams as a color reproduction principle.

Further, although the embodiment employs four primary colors, the number of primary colors is not limited to four, but any number N not less than three may be employed.

In this case, the number of planes that constitute the color reproduction area surfaces is N(N−1). Any primary color may be used, and the invention is not limited to such a color of a high chroma as employed in the embodiment.

Moreover, although four primary color display is realized by two projectors, a single projector may be used if it can execute four primary color display.

In addition, although in the embodiment, the color reproduction area corner XYZ data is calculated by adding, to a corresponding weighting factor, the XYZ data obtained when a primary color corresponding to a primary color signal is at its maximum emission, the XYZ data corresponding to each combination of primary color signals of each color reproduction area corner may be measured in advance as profile data. Since in this case, the measurement data can be used as the color reproduction area corner XYZ data, highly accurate conversion can be executed even in a display that cannot satisfy additive color mixture condition.

Figure 10:
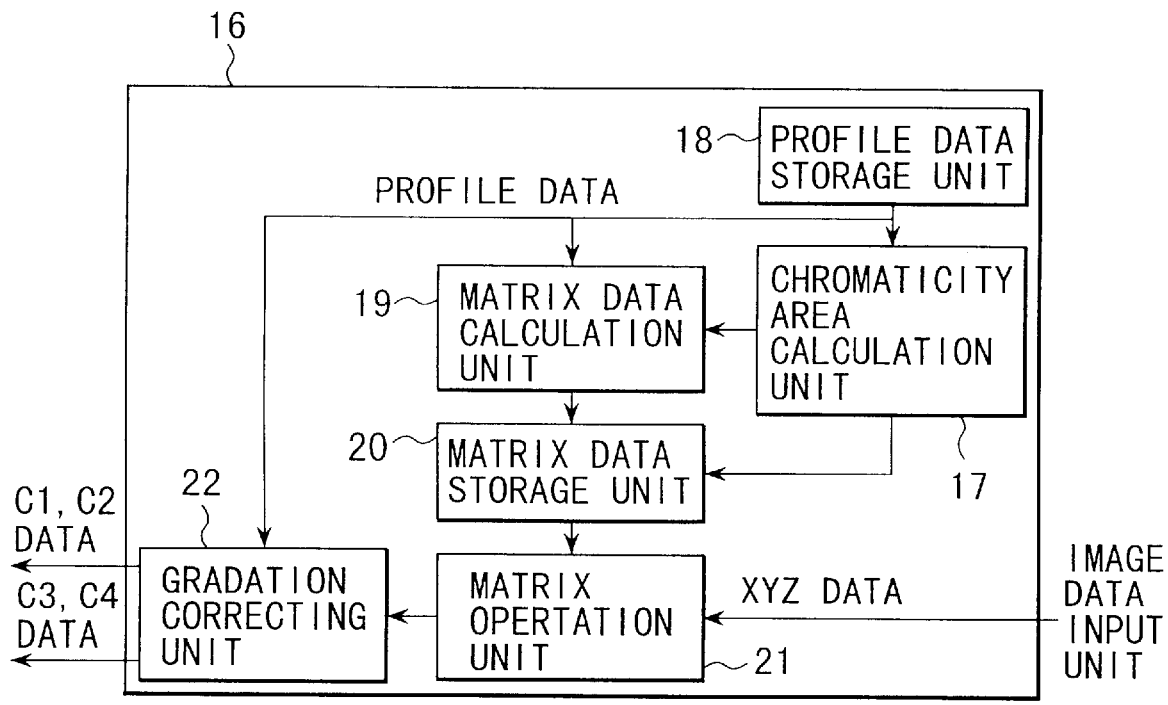
FIG. 10 is a block diagram showing an example of a structure of a color conversion unit employed in a multi-primary-color projector system as a color reproduction system according to a second embodiment of the invention.

Referring then to FIG. 10, an example of an image processing apparatus according to a second embodiment of the invention will be described. This embodiment has a similar structure to the above-described first embodiment except for a color conversion unit 16, and therefore only the characterizing section, i.e. the color conversion unit 16, of the second embodiment will be described.

The color conversion unit 16 comprises a chromaticity area calculation unit 17, a profile data storage unit 18, a matrix data calculation unit 19, a matrix data storage unit 20, a matrix operation unit 21 and a gradation correcting unit 22.

The chromaticity area calculation unit 17 calculates XYZ data (color reproduction area corner XYZ data) corresponding to signals (color reproduction area corner signals) indicating the corners of the planes of the quadrilaterals that constitute the color reproduction area surfaces of the display, on the basis of combinations of XYZ data items stored in the profile data storage unit 18 and obtained when each primary color is at its maximum emission. The calculated data is input to the matrix data calculation unit 19.

The chromaticity area calculation unit 17 obtains an area of the chromaticity plane, which is enclosed by the color reproduction area corner XYZ data, and supplies it as chromaticity area data to the matrix data storage unit 20. The matrix data calculation unit 19 calculates color reproduction area corner XYZ data of three of the four corners obtained by the chromaticity area calculation unit 17, and color reproduction area corner signal values corresponding thereto, thereby calculating matrix data and inputting it to the matrix data storage unit 20. The matrix data storage unit 20 stores the matrix data in relation to chromaticity area data. The matrix data of a k-th color reproduction area surface is given by the following formula:

$$\begin{pmatrix} d11(k) & d12(k) & d13(k) \\ d21(k) & d22(k) & d23(k) \\ d31(k) & d32(k) & d33(k) \\ d41(k) & d42(k) & d43(k) \end{pmatrix} = \begin{pmatrix} C11(k) & C21(k) & C31(k) \\ C12(k) & C22(k) & C32(k) \\ C13(k) & C23(k) & C33(k) \\ C14(k) & C24(k) & C34(k) \end{pmatrix} \begin{pmatrix} X1(k) & X2(k) & X3(k) \\ Y1(k) & Y2(k) & Y3(k) \\ Z1(k) & Z2(k) & Z2(k) \end{pmatrix}^{-1} \quad (8)$$

where $Cij(k)$ represents the j-th (j=1–4) signal value of the i-th (i=1–3) color reproduction area corner of the k-th (k=1–8) area. Similarly, $Xi(k)$ represents the X data of the i-th corner of the k-th area. The same can be said of Y and Z.

Figure 11:
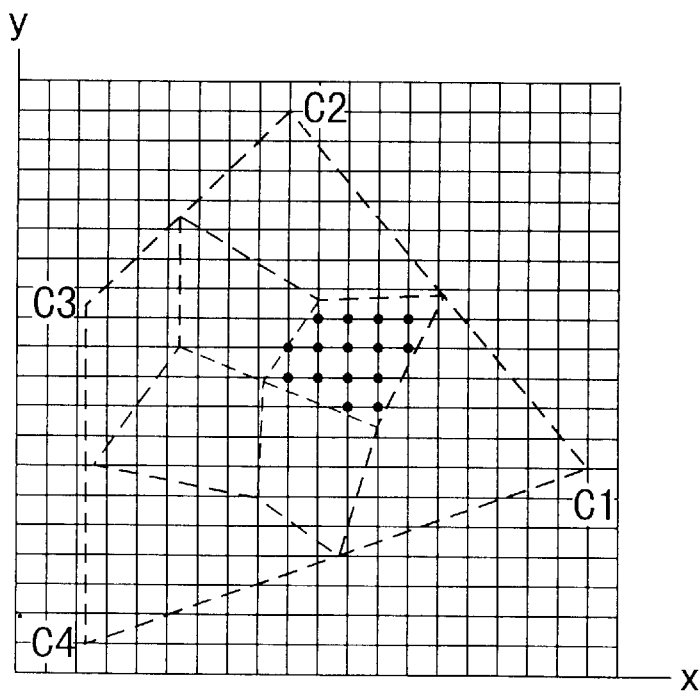
FIG. 11 is a graph illustrating an example of two-dimensional table data used for calculating a chromaticity area.

As is shown in FIG. 11, the correspondence between matrix data and chromaticity areas is given by a two-dimensional table that stores an area number k using a predetermined sample chromaticity value as an address.

The above-mentioned processing is executed on all chromaticity areas k.

The matrix operation unit 21 converts XYZ data input from the image data input unit 1, into display signals using the pre-prepared matrix data and two-dimensional table data.

First, XYZ data is converted into chromaticity data xy, then the area number k to which the data xy belongs is obtained from the two-dimensional table, and display signals (Q1, Q2, Q3, Q4) are calculated using matrix data corresponding to k and the following formula:

$$\begin{pmatrix} Q1 \\ Q2 \\ Q3 \\ Q4 \end{pmatrix} = \begin{pmatrix} d11(k) & d12(k) & d13(k) \\ d21(k) & d22(k) & d23(k) \\ d31(k) & d32(k) & d33(k) \\ d41(k) & d42(k) & d43(k) \end{pmatrix} \begin{pmatrix} X \\ Y \\ Z \end{pmatrix} \quad (9)$$

The display signals are input to the gradation correcting unit 22, where they are corrected using gradation characteristic data contained in the profile data. The corrected data is output to the output boards 7 and 8.

Figure 12:
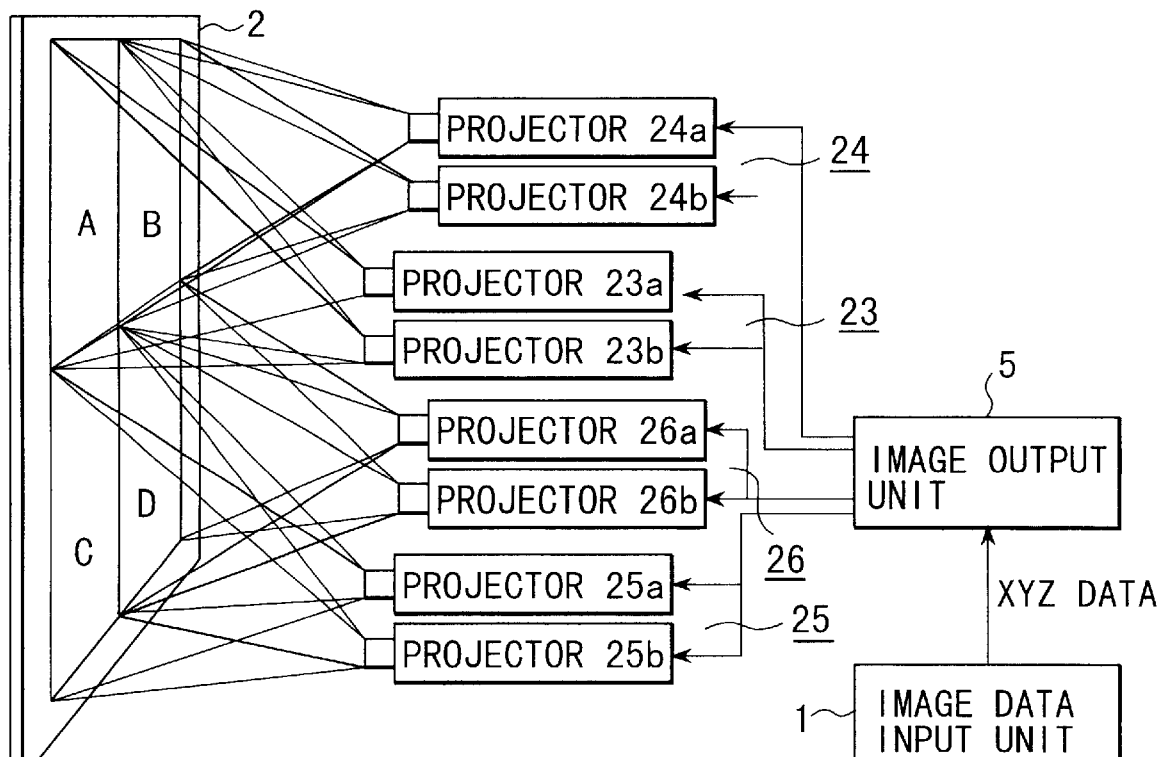
FIG. 12 is a view illustrating an example of a multi-primary-color overlapping display system as an image processing system according to a third embodiment of the invention.

Referring to FIG. 12, an example of an image processing apparatus according to a third embodiment of the invention will be described.

In the third embodiment, six primary color display is executed by six-primary-color display units 23–26 each including two projectors and a screen divided into four portions. More specifically, four combinations of projectors, i.e. eight projectors in total, are used to establish a six-primary-color overlapping display system with an enlarged color reproduction area, which can display very fine images.

For example, the six-primary-color display unit 23 consisting of projectors 23a and 23b displays a color image formed of six primary colors on a screen component A that constitutes an upper left portion of the screen. Similarly, projectors 24, 25 and 26 display images of six primary colors on screen components B, C and D, respectively.

This six-primary-color display system executes color conversion in a similar manner to the four-primary-color display employed in the first or second embodiment, and executes six primary color display by assigning three primary colors to each projector included in each combination.

Figure 13:
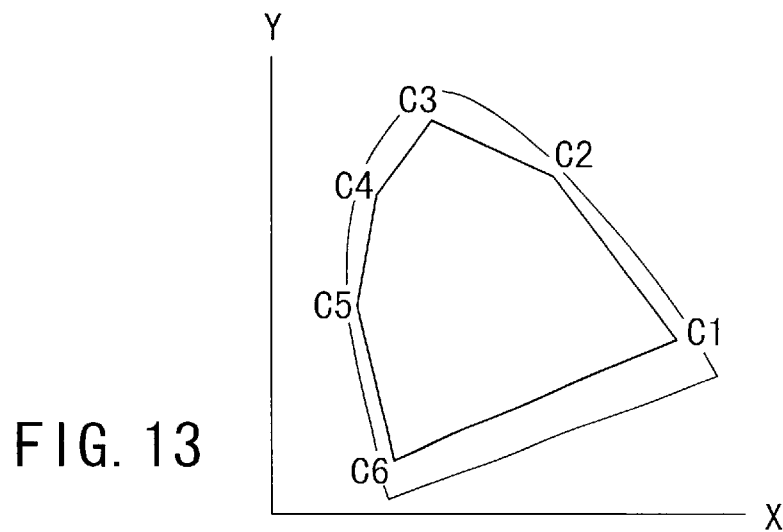
FIG. 13 is a view showing a color reproduction area on the xy chromaticity plane of a six-primary-color display incorporated in the third embodiment.

FIG. 13 schematically illustrates a color reproduction area on the xy chromaticity diagram for the six-primary-color display.

In a multi-primary-color-overlapping display system such as a six-primary-color-overlapping display system, it is necessary to execute image positioning and color matching within each display area, as well as positioning of projected images in the different display areas.

A method for positioning to-be-overlapped images is disclosed in Japanese Patent Application KOKAI Publication No. 9-326981 proposed by the same applicant as the present application. This technique is also applicable to the positioning of images projected by two projectors that constitute a multi-primary-color display.

Further, although in an overlapping display system, it is also necessary to match to-be-overlapped images in color or brightness, this kind of matching is not a big problem in the system using projectors of the same type in which there is no great difference in structure and characteristics.

However, in a multi-primary-color-overlapping display system, a great number of primary colors are used and hence it is highly possible that even slight differences in structure and characteristics between projectors will cause not a slight influence on the entire image. Therefore, a color correction device is necessary for each display area.

Figure 14:
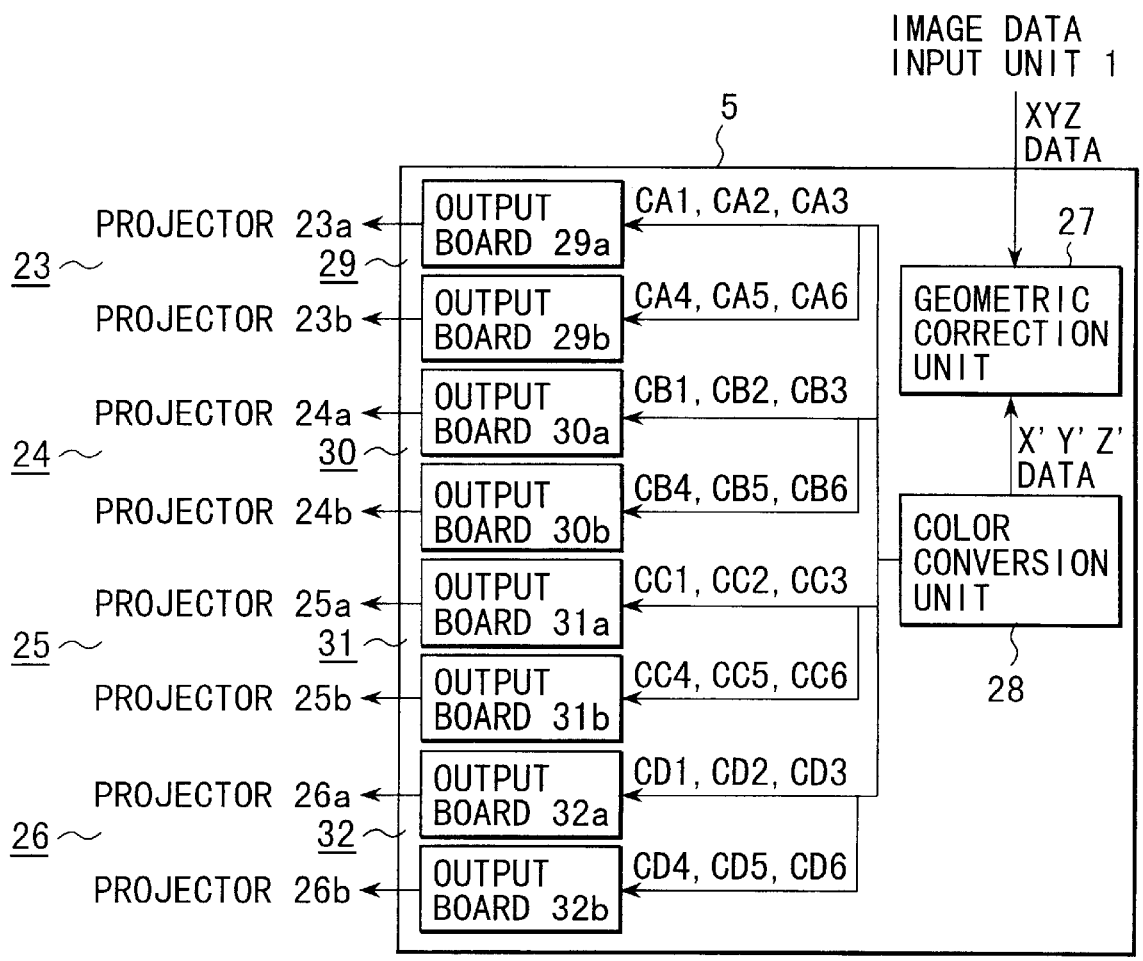
FIG. 14 is a view illustrating an image output unit incorporated in the six-primary-color display system of the third embodiment.

FIG. 14 shows an image output device including a device for performing such correction.

The image output device employed in the third embodiment comprises a geometric correction unit 27 for performing correction, a color conversion unit 28 for creating, by conversion, a signal to be supplied to projectors, and output boards 29–32 for outputting image data to the respective projectors.

The geometric correction unit 27 creates X' Y' Z' image data that is obtained on the basis of very fine image data consisting of the XYZ data of each pixel input by the image data input unit 1, and that is obtained by correcting the position of each projector and/or geometrical distortion of data input thereto. For further particulars concerning the correction processing of the geometric correction unit 27, see the aforementioned publication No. 9-326981.

The color conversion unit 28 converts XYZ image data to be input to each projector, into a signal to be input thereto on the basis of the profile data of each projector obtained by measurement. Since the color conversion method employed in the color conversion unit 28 is the same as that described in the second embodiment, no description will be given of the method.

Figure 15:
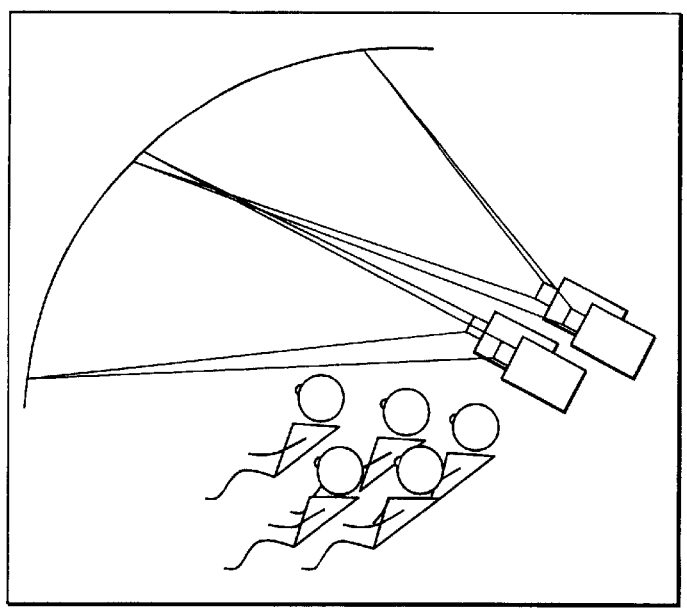
FIG. 15 is a view showing a modification of the third embodiment, in which a dome-shaped screen is used.
Figure 16:
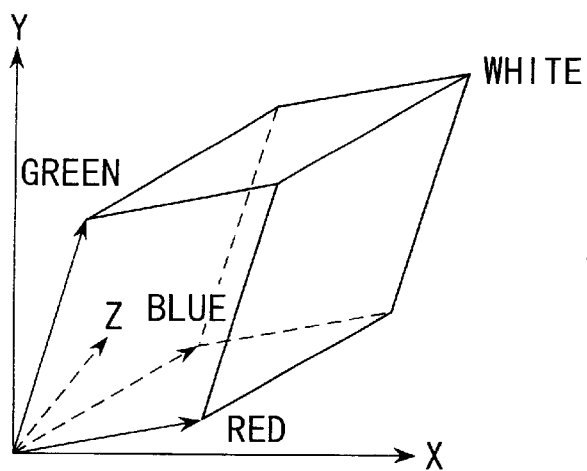
FIG. 16 is a graph showing a color reproduction area in the XYZ space of a conventional three-primary-color display.
Figure 17:
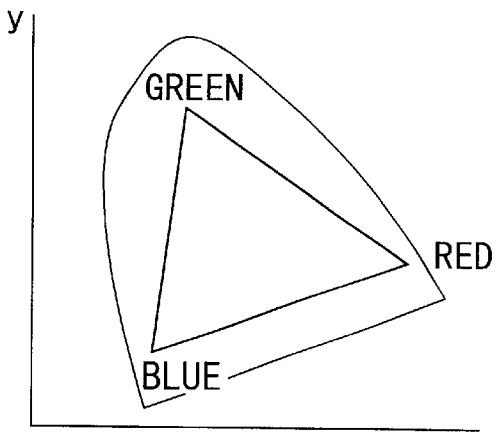
FIG. 17 is a graph showing a color reproduction area on the xy chromaticity diagram of the conventional three-primary-color display.
Figure 18:
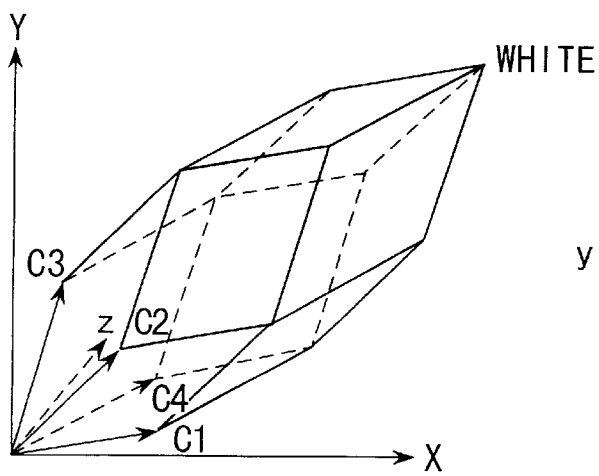
FIG. 18 is a graph showing a color reproduction area in the XYZ space of the conventional four-primary-color display.
Figure 19:
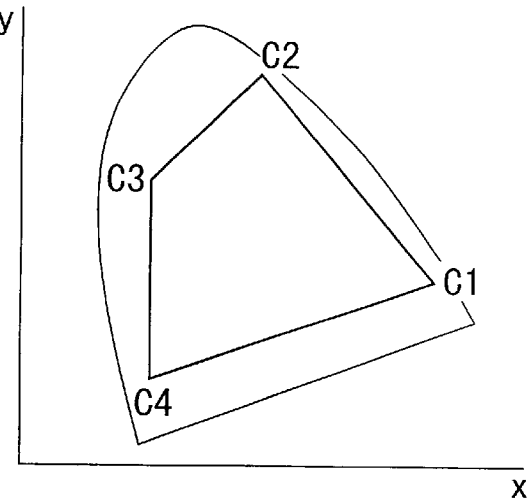
FIG. 19 is a graph showing a color reproduction area on the xy chromaticity diagram of the conventional four-primary-color display.

FIG. 15 shows another example of the multi-primary-color-overlapping display system as a modification of the third embodiment. This system has a screen of a dome shape, i.e. a screen of a curved surface. It is a matter of course that the projection surface of the screen is not limited to this shape, but may be a flat surface, a spherical surface, a curved surface or a combined surface thereof. Basically, it suffices if a single projection surface is seen from the projector side. For example, the screen may have a stepped surface which is, however, seen flat from the projection side of the projectors. Alternatively, the screen may have a plurality of surfaces arranged parallel to each other so that they will be seen as a single projection surface from the projector side.

In the multi-primary-color-overlapping display system constructed as above, an image formed using an optional number of primary colors and consisting of an optional number of overlapping images can be projected on a screen of any desired shape, and a color image of an excellent color reproductivity, a wide angle of field and a high resolution can be displayed.

As described above in detail, the invention provides a color reproduction system including a multi-primary-color display, which can realize colorimetrically accurate color reproduction, continuity between XYZ data and signal values, and maximum use of its color reproduction area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproduction system having color image display means, arid color conversion means for converting input tristimulus values into a color image signal to be input to the color image display means, wherein the color conversion means comprises:

maximum brightness signal calculating means for calculating three color reproduction area corner vectors that indicate three corners of a plane constituting a color reproduction area surface of the color image display means, the three color reproduction area corner vectors surrounding vectors of the input tristimulus values, the maximum brightness signal calculating means also calculating a weighting factor obtained when the input tristimulus values are expressed as a linear sum of tristimulus values of the color reproduction area corner vectors; and color image signal calculating means for calculating a color image signal used to display the input tristimulus values, on the basis of signal values corresponding to the color reproduction area corner vectors and the weighting factor.

2. A color reproduction system having color image display means, and color conversion means for converting input tristimulus values into a color image signal to be input to the color image display means, wherein the color conversion means comprises:

chromaticity area calculating means for calculating a chromaticity area surrounded by corners of planes constituting a color reproduction area surface of the color image display means;

matrix calculating means for calculating matrix data that provides a relationship between tristimulus values of the corners and the color image signal;

matrix data storage means for storing the matrix data in relation to the chromaticity area; and color image signal calculating means for converting the input tristimulus values into the color image signal, using part of the matrix data selected on the basis of chromaticity values of the input tristimulus values.

3. A color reproduction system according to claim 1, further comprising profile data storage means storing profile data of the color image display means to be supplied to the color conversion means, the profile data including XYZ values obtained when each primary color is at its maximum emission and gradation characteristic data that provides a relationship between an input signal and emission brightness.

4. A color reproduction system according to claim 2, further comprising profile data storage means storing profile data of the color image display means to be supplied to the color conversion means, the profile data including gradation characteristic data that provides a relationship between XYZ values obtained when each primary color is at its maximum emission, an input signal and emission brightness.

5. A color reproduction system according to claim 1, wherein the color image display means includes a plurality of projectors for creating and projecting an image based on the color image signal and formed of an optional number of primary colors, the number of the projectors being determined on the basis of a necessary number of colors, the projectors projecting images onto a single screen such that the projected images constitute a single image.

6. A color reproduction system according to claim 2, wherein the color image display means includes a plurality of projectors for creating and projecting an image based on the color image signal and formed of an optional number of primary colors, the number of the projectors being determined on the basis of a necessary number of colors, the projectors projecting images onto a single screen such that the projected images constitute a single image.

7. A color reproduction system according to claim 3, wherein the color image display means includes a plurality of projectors for creating and projecting an image based on the color image signal and formed of an optional number of primary colors, the number of the projectors being determined on the basis of a necessary number of colors, the projectors projecting images onto a single screen such that the projected images constitute a single image.

8. A color reproduction system according to claim 5, wherein the single screen is divided into a plurality of areas, and the number of the projectors is determined on the basis of a necessary number of colors in each of the areas, the projectors projecting images onto the respective areas of the single screen such that the projected images constitute a single image.

9. A color reproduction system according to claim 6, wherein emission spectra of the projectors distribute in a visible wavelength range of 380 nm–780 nm.

10. A color reproduction system according to claim 7, wherein emission spectra of the projectors distribute in a visible wavelength range of 380 nm–780 nm.

11. A color reproduction system according to claim 8, wherein emission spectra of the projectors distribute in a visible wavelength range of 380 nm–780 nm.

12. A color reproduction system according to claim 5, wherein emission spectra of the projectors distribute in a visible wavelength range of 380 nm–780 nm.

13. A color reproduction system according to claim 1, wherein the color image display means includes a CRT display or a liquid crystal display, which performs color reproduction by mixing primary color beams.

14. A color reproduction system according to claim 2, wherein the color image display means includes a CRT display or a liquid crystal display, which performs color reproduction by mixing primary color beams.

15. A color reproduction system according to claim 3, wherein the color image display means includes a CRT display or a liquid crystal display, which performs color reproduction by mixing primary color beams.

16. A color reproduction system according to claim 4, wherein the color image display means includes a CRT display or a liquid crystal display, which performs color reproduction by mixing primary color beams.

17. A color reproduction system according to claim 5, wherein the color image display means includes a CRT display or a liquid crystal display, which performs color reproduction by mixing primary color beams.

18. A color reproduction system according to claim 6, wherein the color image display means includes a CRT display or a liquid crystal display, which performs color reproduction by mixing primary color beams.

19. A color reproduction system according to claim 5, wherein the single screen has a projection surface which is at least one of flat, spherical, and curved.

20. A color reproduction system according to claim 6, wherein the single screen is divided into a plurality of areas, and the number of the projectors is determined on the basis of a necessary number of colors in each of the plurality of areas, the projectors projecting images onto respective areas of the single screen such that the projected images constitute a single image.

21. A color reproduction system according to claim 4, wherein the color image display means includes a plurality of projectors which create and project an image based on the color image signal which is formed of primary colors, the number of the projectors being determined on the basis of a necessary number of colors, the projectors projecting images onto a single screen such that the projected images constitute a single image.

22. A color reproduction system according to claim 6, wherein the single screen has a projection surface which is at least one of flat, spherical, and curved.

* * * * *